United States Patent
Mishra et al.

(10) Patent No.: US 9,639,425 B1
(45) Date of Patent: May 2, 2017

(54) SIGNATURE-BASED SLEEP RECOVERY OPERATION FLOW

(71) Applicant: Marvell International Ltd., Hamilton (BM)

(72) Inventors: Saswat Mishra, Santa Clara, CA (US); Tao Yu, Milpitas, CA (US); Jungil Park, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/968,466

(22) Filed: Dec. 14, 2015

Related U.S. Application Data

(60) Provisional application No. 62/102,891, filed on Jan. 13, 2015, provisional application No. 62/184,384, filed on Jun. 25, 2015.

(51) Int. Cl.

| G06F 9/00 | (2006.01) |
|---|---|
| G06F 15/177 | (2006.01) |
| G06F 11/14 | (2006.01) |
| G06F 9/44 | (2006.01) |
| G06F 11/22 | (2006.01) |
| G06F 11/263 | (2006.01) |
| G06F 7/02 | (2006.01) |
| G06F 21/73 | (2013.01) |
| G06F 12/14 | (2006.01) |
| G06F 21/64 | (2013.01) |
| G06F 21/56 | (2013.01) |
| G06F 21/57 | (2013.01) |

(52) U.S. Cl.
CPC ........ G06F 11/1441 (2013.01); G06F 9/4403 (2013.01); G06F 11/2284 (2013.01); G06F 11/2635 (2013.01); G06F 7/02 (2013.01); *G06F 11/1417* (2013.01); *G06F 12/1408* (2013.01); *G06F 21/565* (2013.01); *G06F 21/57* (2013.01); *G06F 21/575* (2013.01); *G06F 21/64* (2013.01); *G06F 21/73* (2013.01); *G06F 2011/2278* (2013.01)

(58) Field of Classification Search
CPC ........ G06F 21/57; G06F 21/73; G06F 21/575; G06F 21/64; G06F 12/1408; G06F 11/1417; G06F 21/565; G06F 7/02
See application file for complete search history.

(56) References Cited

U.S. PATENT DOCUMENTS

| 2001/0007131 A1* | 7/2001 | Galasso | G06F 21/575 713/187 |
|---|---|---|---|
| 2004/0143710 A1* | 7/2004 | Walmsley | B41J 2/04505 711/144 |
| 2014/0082724 A1* | 3/2014 | Pearson | G06F 21/575 726/22 |

* cited by examiner

*Primary Examiner* — Xuxing Chen

(57) ABSTRACT

The present disclosure describes methods and apparatus for implementing a signature-based sleep recovery operation flow for booting a system-on-chip (SoC). When the SoC begins its normal boot flow, a controller retrieves a sleep recovery signature from a register and compares the retrieved sleep recovery signature to a default signature. If the sleep recovery signature matches the default signature, the SoC enters a ROM checksum fail debug flow and, upon satisfying the requirements of the ROM checksum fail debug flow, enters a sleep recovery boot flow, which restores the SoC to the operational state it was in prior to entering the sleep mode. If the sleep recovery signature does not match the default signature, the SoC continues with the normal boot flow or, by use of external pins, can be forced into a normal debug mode flow so that the boot code can be debugged.

20 Claims, 6 Drawing Sheets

SIGNATURE-BASED SLEEP RECOVERY OPERATION FLOW

CROSS-REFERENCE TO RELATED APPLICATION

This present disclosure claims priority to U.S. Provisional Patent Application Ser. No. 62/102,891 filed Jan. 13, 2015, and to U.S. Provisional Patent Application Ser. No. 62/184,384 filed Jun. 25, 2015, the disclosures of each of which are incorporated herein by reference in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

As system-on-chip (SoC) applications become more powerful, they are using increasingly complex memory subsystems that require larger and more complex boot (initialization) flows. The size and complexity of these boot flows make them very difficult to debug if there is an error in a boot flow. This problem is only exacerbated as the complexity and size of these boot flows make it more likely that there will be errors in the boot flows during their design and development.

SUMMARY

This summary is provided to introduce subject matter that is further described below in the Detailed Description and Drawings. Accordingly, this Summary should not be considered to describe essential features nor used to limit the scope of the claimed subject matter.

In general, in one aspect, this specification describes a method for booting a system-on-chip (SoC). The method includes retrieving a sleep recovery signature from a register of the SoC, the sleep recovery signature having been set in the register of the SoC prior to the SoC entering the sleep mode. The method also includes comparing the sleep recovery signature to a default signature, entering, responsive to the sleep recovery signature matching the default signature, a ROM checksum fail debug flow, and entering, responsive to the sleep recovery signature not matching the default signature, a normal debug mode flow.

In general, in another aspect, this specification describes an SoC. The SoC includes a register and a controller with a signature comparison module. The signature comparison module is configured to set a signature in the register prior to the SoC entering a sleep mode. The signature comparison module is further configured to, when recovering from the sleep mode, retrieve a sleep recovery signature from the register, compare the sleep recovery signature to a default signature, enter, responsive to the sleep recovery signature matching the default signature, a ROM checksum fail debug flow, and enter, responsive to the sleep recovery signature not matching the default signature, a normal debug mode flow.

In general, in yet another aspect, this specification describes a device comprising a boot read only memory (ROM), a memory and a system-on-chip (SoC). The SoC comprises a register and a controller configured to set a signature in the register prior to the SoC entering a sleep mode. The controller is further configured to, when recovering from the sleep mode, retrieve a sleep recovery signature from the register, compare the sleep recovery signature to a default signature, enter, responsive the sleep recovery signature matching the default signature, a ROM checksum fail debug flow, and enter, responsive to the sleep recovery signature not matching the default signature, a normal debug mode flow.

BRIEF DESCRIPTION OF THE DRAWINGS

In the figures, the left-most digit of a reference number identifies the figure in which the reference number first appears. The use of the same reference numbers in different instances in the description and the figures indicate like elements.

DETAILED DESCRIPTION

Figure 1:
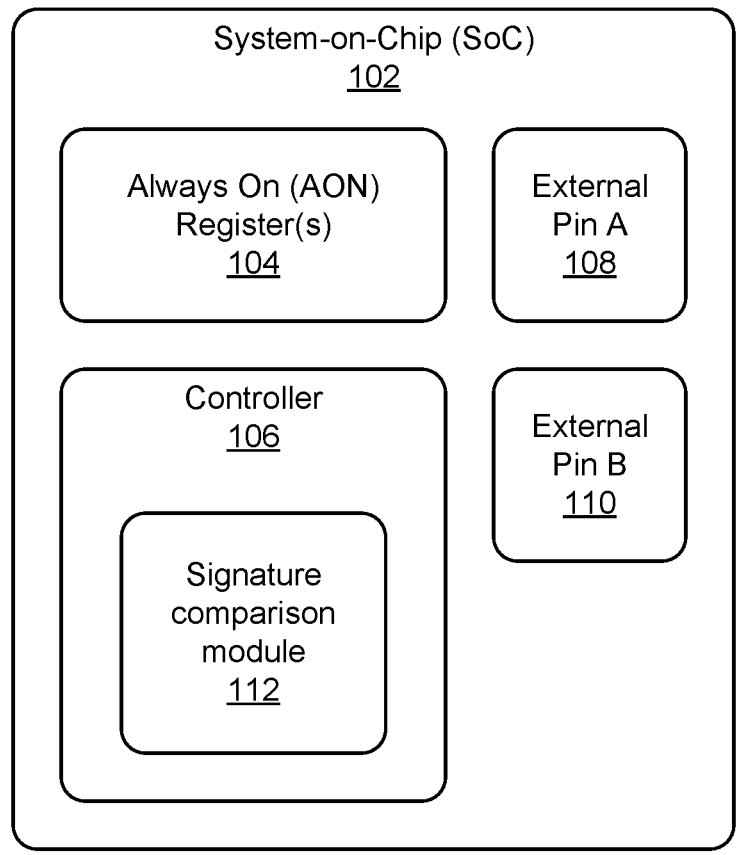
FIG. 1 illustrates an example System-on-Chip (SoC) in which the methods and apparatus for implementing a signature-based sleep recovery operation flow can be used in accordance with one or more embodiments.

Methods and apparatus for implementing a signature-based sleep recovery operation flow are discussed herein. The signature-based sleep recovery operation flow enables faster and more effective debugging of a device or a system-on-chip (SoC) by implementing a single operation flow that supports multiple boot flows. Each of these multiple boot flows is a sequence of operations or actions performed in booting the device or SoC into different operational states. These multiple boot flows are combined into a single multi-branch operation flow that uses a signature comparison operation and external pins to separate the boot flows for different operational states. This single operation flow with isolated boot flows allows for easier debugging because the errors are segmented by boot flow and the boot code can be downloaded to an external memory (e.g., static random access memory (SRAM)) for faster debugging.

The operation flow comprises a normal boot flow, a normal debug mode flow, a ROM checksum fail boot flow, and a sleep recovery boot flow. The normal boot flow is a sequence of operations that initializes the SoC to a fully functional state, and the other boot flows branch from the normal boot flow. The operation flow described in this application begins with the normal boot flow.

The normal debug mode flow is a branch from the normal boot flow for one outcome of the signature comparison operation that is further described below. The normal debug mode flow enables the boot code to be downloaded from the boot ROM to another location, external to the SoC, for debugging. The ROM checksum fail debug flow is the boot flow that results from another outcome of the signature comparison operation. In the ROM checksum fail debug flow, a checksum algorithm is applied to the ROM in each CPU of the SoC. If each CPU ROM passes the checksum algorithm, the operation flow continues as described below. Otherwise, a CPU ROM failure notice is output and the SoC does not boot.

As noted above, if each CPU ROM passes the checksum algorithm, the operation flow continues to determine whether the SoC is recovering from a sleep mode. The sleep mode refers to a low-power mode in which the SoC is not performing most of its functionality (is not operating in its fully functional state), but is able to resume its fully functional state by being woken up. If the SoC is recovering from a sleep mode, the SoC enters the sleep recovery boot flow. This flow allows the SoC to boot the SoC back to the state it was in prior to entering the sleep mode. If the SoC is not recovering from a sleep mode (e.g., it is recovering from a hard restart), the normal boot flow continues and the SoC initializes to a fully functional state.

In one aspect, this specification describes an SoC that includes an always on (AON) register, a controller, and at least two external pins. The controller includes a signature comparison module that enables the single operation flow, multiple boot flow sleep recovery. In another aspect, this specification describes a device that includes the SoC described above, along with a memory device and a boot ROM.

FIG. 1 illustrates an example SoC 102 implementing signature-based sleep recovery operation flow in accordance with one or more embodiments. The SoC 102 can be implemented or used as at least part of any of a variety of different types of devices, such as an output device (e.g., a printer, an audio and/or video player), an input device (e.g., a scanner, a camera), a control device, a desktop or laptop computing device, a tablet or phone device, an internet of things (IoT) device, and so forth. The SoC 102 is typically implemented as part of a single device, although alternatively can be implemented across multiple devices. In one or more embodiments, the SoC 102 is a memory controller. However, it should be noted that the SoC 102 can additionally or alternatively implement various other functionality.

The SoC 102 includes one or more always on (AON) registers 104, a controller 106, an external pin A 108, and an external pin B 110. The AON registers 104 are registers for storing a sleep recovery signature, along with other system values that allow the SoC 102 to recover from a low power state (e.g., a sleep mode) to a previous state. The AON registers 104 are powered or otherwise nonvolatile so that the value(s) store in the AON registers 104 are preserved while the SoC 102 is in a sleep or other low-power state. The controller 106 includes a signature comparison module 112 that enables the controller 106 to implement the signature-based sleep recovery operation flow for the SoC 102.

External pin A 108 and external pin B 110 are used to force the flow to enter the normal debug mode flow via first and second check modes, as further described with reference to FIG. 6. In one or more embodiments, the external pin A 108 and the external pin B 110 are general purpose input/output (GPIO), although alternatively the external pin A 108 and/or the external pin B 110 can be other types of pins. Additionally, while the external pin A 108 and the external pin B 110 are illustrated as individual pins on FIG. 1, either or both of the external pin A 108 and the external pin B 110 can represent multiple external pins.

The AON registers 104 and the signature comparison module 112 provide the functionality that enables the signature-based sleep recovery operation flow. The signature comparison module 112 retrieves the sleep recovery signature from the AON registers 104 and compares the retrieved sleep recovery signature with a default signature to initially determine a particular boot flow for the SoC 102, and external pin A 108 and external pin B 110 allow the user to force a particular boot flow for debugging as noted above. The AON registers 104 are discussed further with reference to FIG. 3 below, and the comparison process is discussed with respect to FIGS. 4-6 below.

Figure 2:
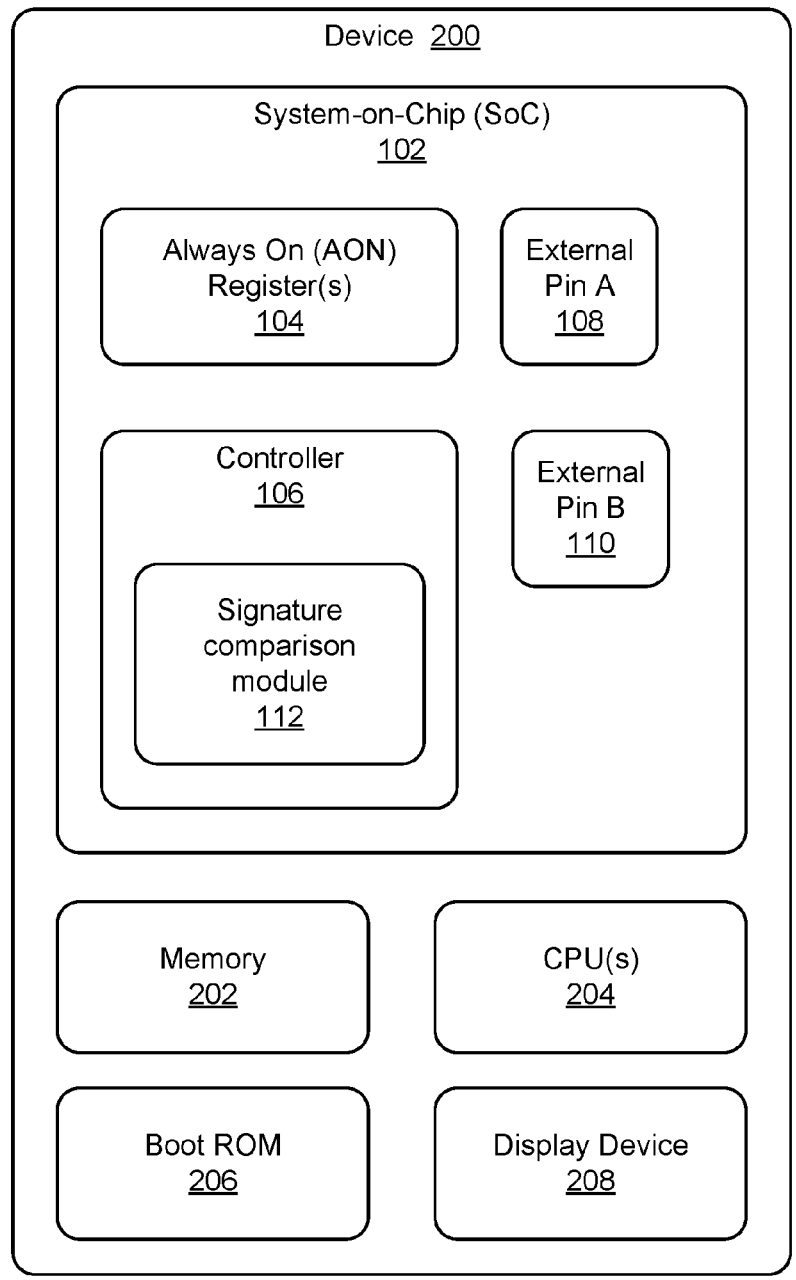
FIG. 2 is an example device in which an SoC that implements a signature-based sleep recovery operation flow can be used in accordance with one or more embodiments.

FIG. 2 illustrates an example device 200 implementing the signature-based sleep recovery operation flow. The device 200 includes the SoC 102 described with reference to FIG. 1, a memory 202, one or more central processing units (CPUs) 204, a boot read only memory (ROM) 206, and a display device 208. The memory 202 is the working memory for the device 200 and the boot ROM 206 provides the boot code for the device 200. In one or more embodiments, the memory 202 is a double data rate (DDR) synchronous dynamic random access memory (DDR SDRAM), but other types of memory can additionally or alternatively be used. The display device 208 may be any type of display device compatible with the device 200, such as an LCD screen, an LED display, and so forth. While the display device 208 is depicted in FIG. 2 as being integrated with the device 200, the display device 208 can alternatively be communicatively coupled with the device 200 using any of a variety of mechanisms, including a cable or a wireless connection such as a LAN connection, a Bluetooth™ connection, a Universal Serial Bus (USB) connection, and so forth. The device 200 may be a desktop or laptop computing device, a tablet or phone device, an IoT device, and so forth.

Figure 3:
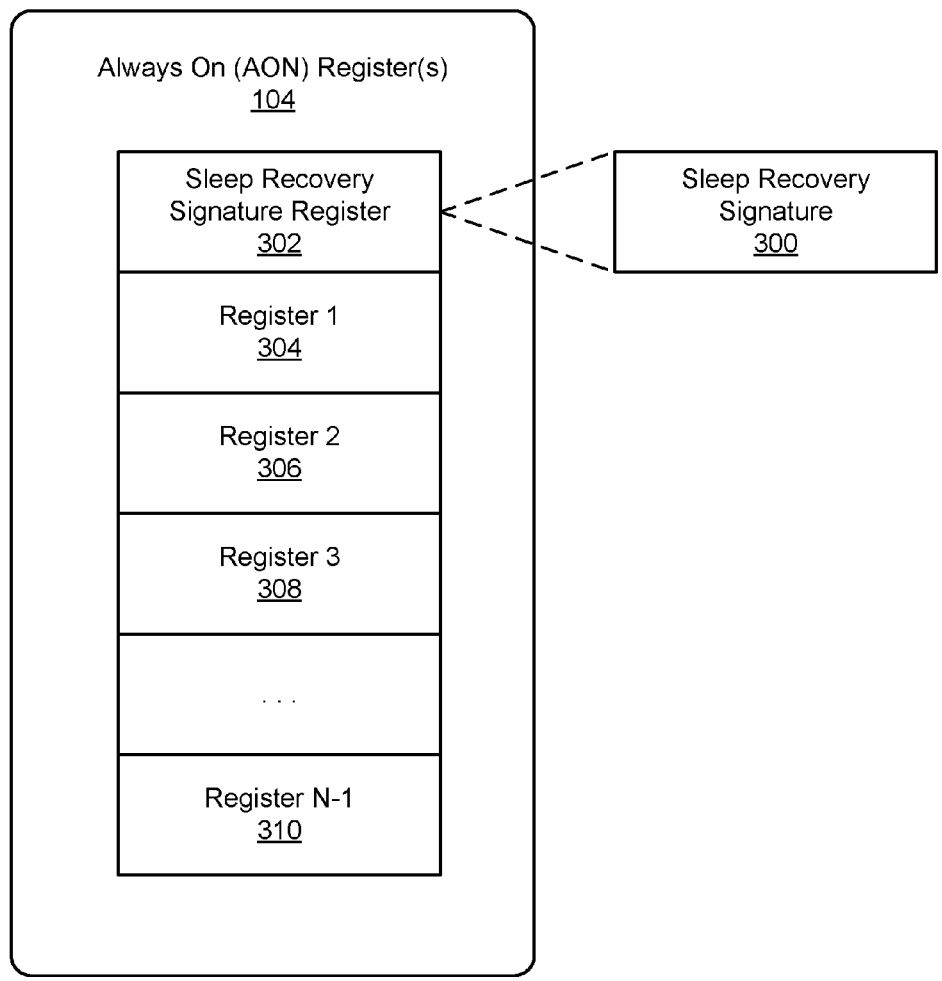
FIG. 3 is an example of an always on (AON) memory register stack that can be used to implement the signature comparison that enables a signature-based sleep recovery operation flow.

FIG. 3 illustrates the AON registers 104 in additional detail in accordance with one or more embodiments. As noted above with respect to FIG. 2, the AON registers 104 are a register stack of N registers that store system values for sleep recovery. In one or more embodiments the AON registers 104 include 32 registers, although the AON registers 104 can alternatively include other numbers of registers. The system values the SoC 102 uses for sleep recovery are stored in the AON registers 104 prior to entering a sleep mode so that the values can be loaded upon sleep recovery. These values stored in the AON registers 104 include, for example, timing parameters, controller parameters, and so forth, which are used to restore the SoC 102 to the state it was in when it entered the sleep mode. In some embodiments of the signature-based sleep recovery operation flow, as shown on FIG. 3, the first or top register 302 contains a sleep recovery signature 300. In those embodiments, the remaining N-1 registers 304-310 store other system values for sleep recovery. Alternatively, however, the sleep recovery signature 300 may be stored in any of AON registers 104. The sleep recovery signature is discussed below, in relation to the sleep recovery process.

Figure 4:
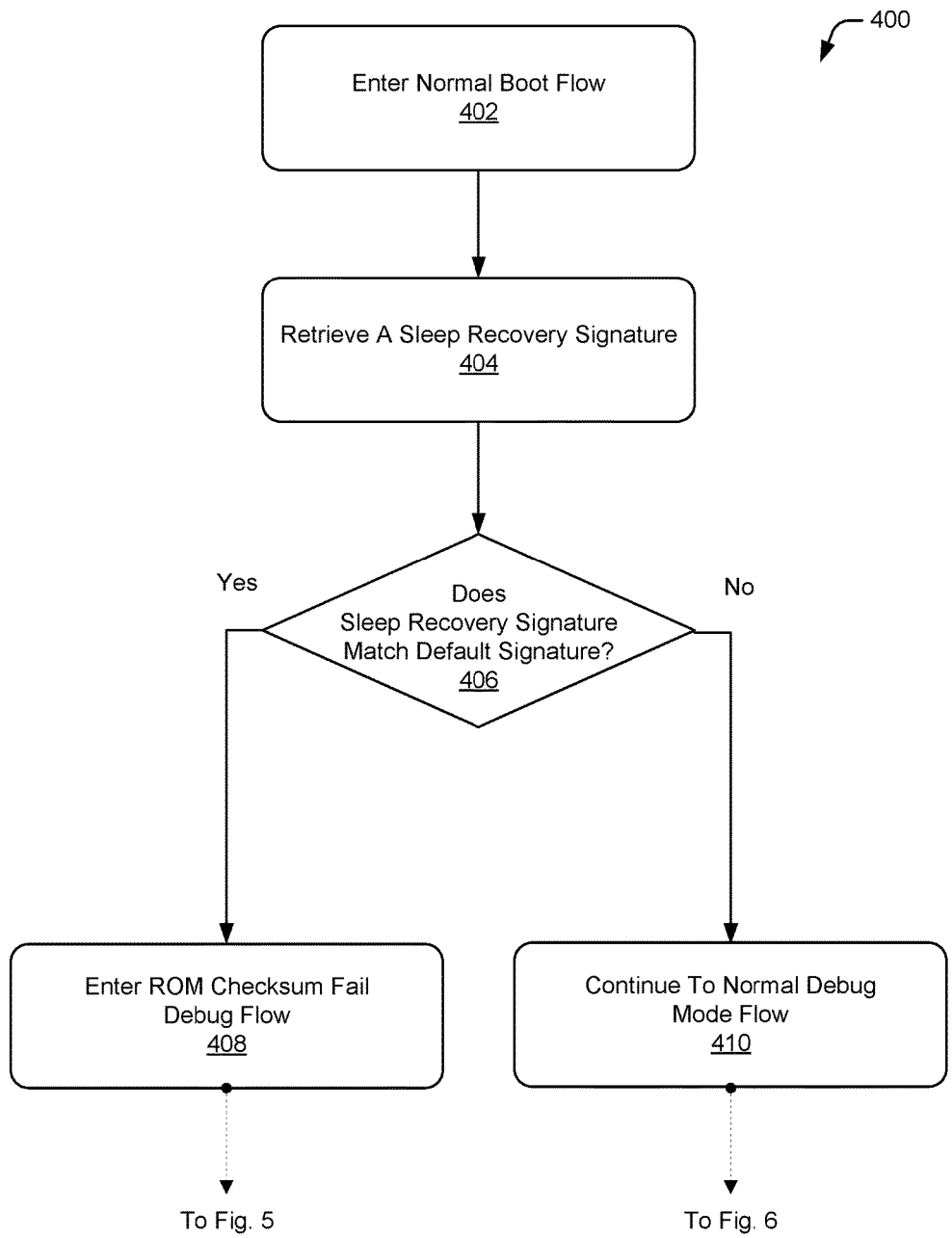
FIGS. 4, 5, and 6 are a flowchart illustrating an example process for implementing the techniques discussed herein in accordance with one or more embodiments.

FIG. 4 is a flowchart illustrating an example process 400 for implementing the signature-based sleep recovery operation flow in accordance with one or more embodiments. The process 400 is described in the form of a set of blocks that specify operations to be performed, however the operations are not necessarily limited to the order shown. The operations performed by the set of blocks in the process 400 are performed by a controller of an SoC, such as the controller 106 of FIG. 1 or FIG. 2.

At block 402, a computing device enters a normal boot flow. The normal boot flow can include any of a variety of different actions and processes, depending on the device that includes the SoC and other factors. For example, the beginning of the normal boot flow may include booting one or more central processing units (CPUs), setting of a universal asynchronous receiver/transmitter (UART) baud rate, initialization of a peripheral component interconnect express (PCIe) bus, and so forth.

Block 404 and block 406 illustrate the signature comparison functionality. At block 404, the signature comparison module 112 retrieves the sleep recovery signature 300 from the AON registers 104. The sleep recovery signature 300 is set in the AON registers 104 before each entry of the SoC 102 into a sleep mode.

At block 406, the signature comparison module 112 compares the retrieved sleep recovery signature 300 to a default signature. If the sleep recovery signature 300 matches the default signature, the flow proceeds to block 408. If the sleep recovery signature 300 does not match the default signature, the operation flow continues to block 410. The default signature is a value used to signal to the controller 106 that the SoC 102 is recovering from a sleep mode. The value of the default signature is known to the signature comparison module 112 prior to recovering from the sleep mode. In some embodiments, the default signature is pre-programmed into the signature comparison module 112. In other embodiments, the default signature can be provided to the signature comparison module 112 during operation of the SoC, or as part of the process of entering the sleep mode, and so forth.

In some embodiments, the signature comparison module 112 determines that the sleep recovery signature matches the default signature only if the sleep recovery signature is exactly the same as the default signature. In that case, if the default signature is a 32 bit value, the signature comparison module 112 would determine that the sleep recovery signature matches the default signature only if all 32 bits of the sleep recovery signature were the same as all 32 bits of the default signature. Alternatively, the signature comparison module 112 can evaluate the sleep recovery signature and determine that it matches the default signature based on other criteria. For example, the signature comparison module could determine a match exists if at least predetermined number of bits are the same, if a particular percentage of bits are the same, and so forth.

At block 408, the SoC 102 enters the ROM checksum fail debug flow. The details of the ROM checksum fail debug flow are described below with reference to FIG. 5.

At block 410, the SoC 102 continues to the normal debug mode flow. The details of the normal debug mode flow are described below with reference to FIG. 6.

Figure 5:
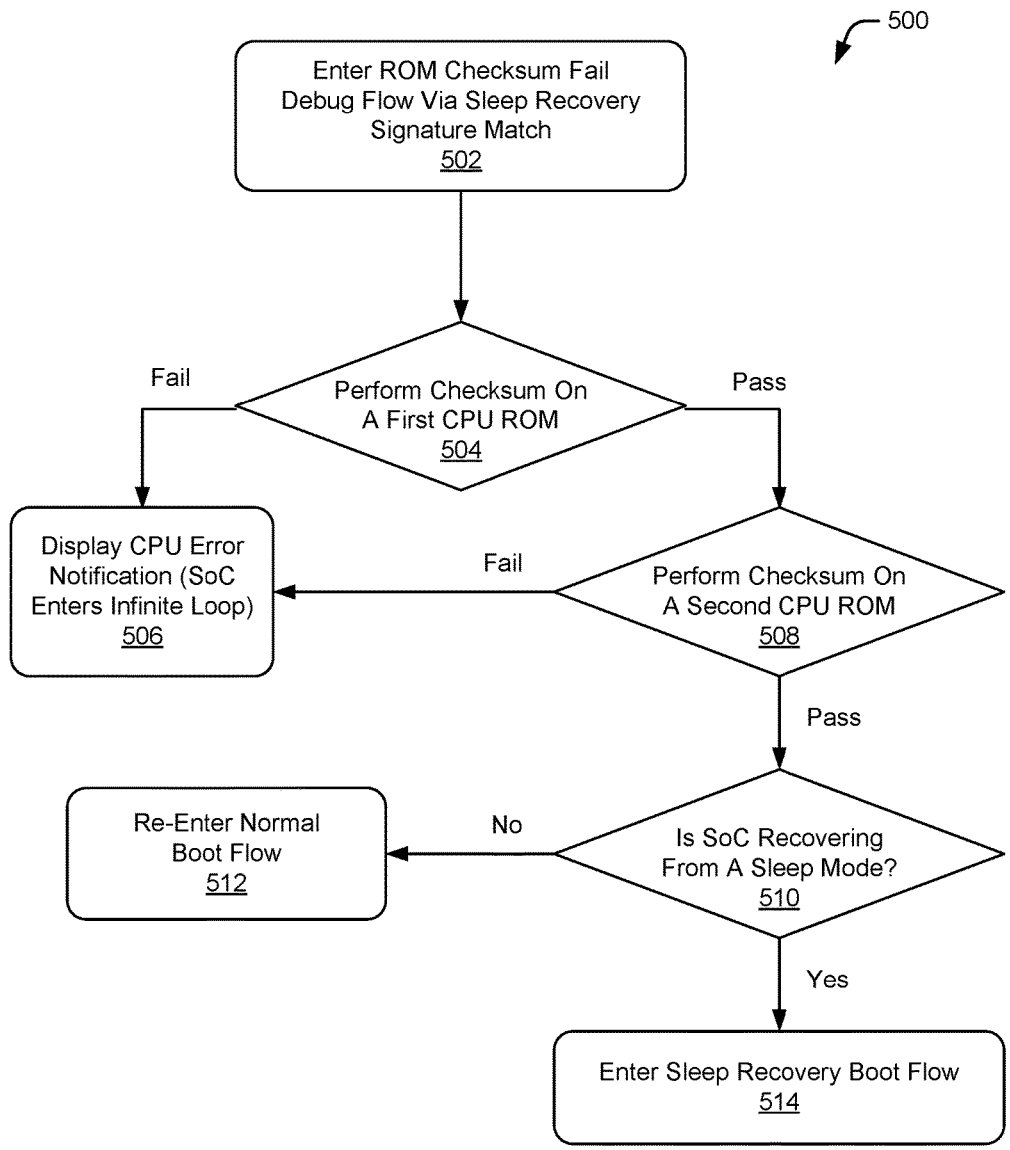

FIG. 5 is a flowchart illustrating an example process 500 for implementing the ROM checksum fail debug flow portion of the signature-based sleep recovery operation flow in accordance with one or more embodiments. The process 500 is described in the form of a set of blocks that specify operations to be performed, however the operations are not necessarily limited to the order shown. The operations performed by the set of blocks in the process 500 are performed by a controller of an SoC, such as the controller 106 of FIG. 1 or FIG. 2.

At block 502, continued from block 408 on FIG. 4, the ROM checksum fail debug flow is entered after a determination that the sleep recovery signature 300 matches the default signature.

At block 504, a checksum is performed on the ROM of a first CPU. The checksum is performed by applying a checksum algorithm to the ROM in the first CPU to generate a checksum value, and comparing that generated checksum value to a known checksum value for the ROM. Any of a variety of public and/or proprietary checksum algorithms can be used. The checksum passes if the generated checksum value matches (e.g., is the same as) the known checksum value for the ROM, and fails if the generated checksum value does not match (e.g., is not the same as) the known checksum value for the ROM. If the result of the checksum is a fail, the ROM checksum fail debug flow proceeds to block 506. If the result of the checksum is a pass, the flow proceeds to block 508.

At block 506, the status of the SoC 102 is displayed. A CPU error notification is optionally displayed and the CPU enters an infinite loop to continue displaying the CPU error notification. The error notification can be displayed on a display device such as the display device 208 that is coupled to the SoC 102, as shown on FIG. 2. Situations can arise, however, in which the status of the SoC 102 cannot be displayed because of a bug or other error in the CPU ROM (e.g., which resulted in the checksum failure of the CPU ROM). In such situations, the CPU still enters an infinite loop at block 506, and the user can readily identify that the CPU is in an infinite loop by analyzing the program counter of the CPU (the program counter will remain the same due to the infinite loop). Thus, entering of the infinite loop can also be referred to as displaying of the CPU error notification.

At block 508, in response to a pass result from performing the checksum on the first CPU ROM, a checksum is performed on the ROM of a second CPU. In some embodiments, the checksum is performed by applying the same checksum algorithm that was applied to the first CPU ROM. In other embodiments, a different algorithm may be used for each CPU ROM that is checked. If the result of this checksum is a fail, the flow proceeds to block 506, described above. If the result of the checksum is a pass, the ROM checksum fail debug flow ends, and the flow proceeds to block 510.

While FIG. 5 illustrates checksum operations performed on a first CPU (block 504) and a second CPU (block 508), the operation flow described herein is not limited to any particular number of CPUs or checksum operations. The process described on FIG. 5 could be expanded or reduced to include any number of CPUs and checksum operations.

At block 510, a determination of whether the SoC 102 is recovering from a sleep mode is made. In some embodiments, the determination of whether the SoC 102 is recovering from a sleep mode is made by the signature comparison module 112 determining that the sleep recovery signature 300 matches the default signature, as described with reference to FIG. 4. Alternatively or additionally, the SoC may use other methods to determine whether to enter the sleep recovery boot flow, such as by applying an algorithm that retrieves the original comparison of the sleep recovery signature and the default signature, or applying an algorithm that checks whether other system parameters have been changed, and so forth. If the SoC 102 determines that it is not recovering from a sleep mode, the flow proceeds to block 512. Otherwise, the flow proceeds to block 514.

At block 512, the normal boot flow is re-entered and initialization of the SoC is completed. The actions or operations in the normal boot flow vary by SoC, but allow the SoC (as well as the device implementing the SoC) to boot to its fully functional state and that allow other components associated with the SoC to be initialized and booted to their fully functional state. In one or more embodiments, in situations in which the SoC is a memory controller, at block 512 the normal boot flow continues by determining whether the phase-locked loop (PLL) clock is set and setting up the PLL clock if necessary. Once the PLL clock is set up, the controller 106 checks whether nonvolatile memory (e.g., one-time programmable (OTP) nonvolatile memory) is ready. If the nonvolatile memory is not ready, the normal boot flow enters a time out cycle. If the nonvolatile memory does not become ready within a particular amount of time (the time out window), a nonvolatile memory Not Ready error is output and the normal boot flow fails.

If the nonvolatile memory is ready, the controller 106 optionally enables the CPU instruction cache and/or performs various self-testing (e.g., Rivest-Shamir-Adleman (RSA) self-testing). If any self-testing is not passed, a self-testing failure error is displayed and the normal boot flow fails. If the self-testing is passed, then various additional code can be copied, downloaded, or otherwise obtained and stored in the memory 202.

At block 514, the sleep recovery boot flow is entered. The sleep recovery boot flow allows the SoC 102 to recover from the sleep mode to the same state in which it entered the sleep mode. The PLL clock is set up and the physical layer (PHY) and controller flow are restored, allowing all of the timing and controller parameters to be restored. Restoring these parameters also includes setting up pages, ports, and total memory.

Continuing at block 514, the refresh process is enabled and the memory 202 is allowed accesses as necessary. The memory 202 then exits the self-refresh mode and resumes normal operation. As with the normal boot flow described with reference to block 512, this process is described for a single CPU. However, other embodiments may include additional CPUs and analogous actions to recover and boot each CPU that is included with the SoC 102.

Figure 6:
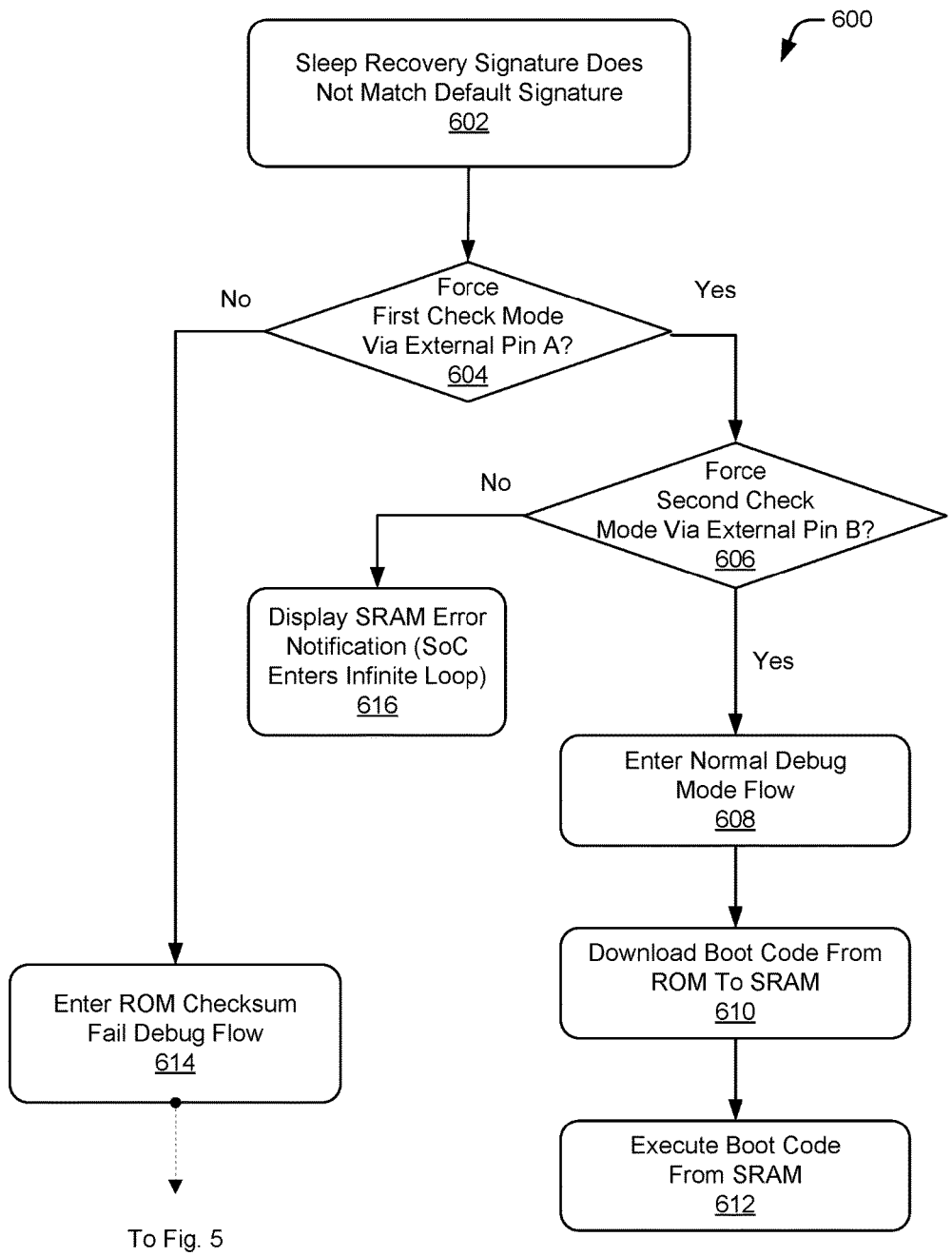

FIG. 6 is a flowchart illustrating an example process 600 for implementing the normal debug mode flow portion of the signature-based sleep recovery operation flow in accordance with one or more embodiments. The process 600 is described in the form of a set of blocks that specify operations to be performed, however the operations are not necessarily limited to the order shown. The operations performed by the set of blocks in the process 600 are performed by a controller of an SoC, such as the controller 106 of FIG. 1 or FIG. 2.

At block 602, continued from block 410 on FIG. 4, the normal debug mode flow is entered after a determination that the sleep recovery signature 300 does not match the default signature.

At block 604, the external pin A 108 can be used to force the operation flow to enter the normal debug mode flow. For example, a user can close a switch or otherwise send a signal to the SoC 102, via the external pin A 108, to complete a first check mode and continue to block 606. If the external pin A 108 is not used to force the flow to enter the normal debug mode flow at block 604, the flow proceeds to block 614, described below.

At block 606, entry into a second check mode, via the external pin B 110, is illustrated. As with the external pin A 108, a user can use a switch or other method to send a signal to the SoC 102, via the external pin B 110, to perform the second check mode and enter the normal debug mode flow and continue to block 608. If the external pin B 110 is not used to force the flow to enter the normal debug mode flow at block 606, the flow proceeds to block 616, described below.

At block 608, the debug mode flow is entered after the second check mode is forced via the external pin B 110. The actions of the debug mode flow are described below with reference to blocks 610 and 612.

At block 610, the boot code is downloaded, via another external pin, from the boot ROM 206 to a static random access memory (SRAM) location that is external to the SoC 102. The boot code can be downloaded to SRAM that is part of the device implementing the SoC 102 (e.g., the boot code can be downloaded to a portion of the memory 202 of FIG. 2), or alternatively to SRAM that is external to the device implementing the SoC 102 (e.g., SRAM external to the device 200 of FIG. 2). Although discussed herein as SRAM, it should be noted that the boot code can alternatively be downloaded to other types of memory.

At Block 612, the boot code is executed from the external SRAM and debugged. The SRAM download allows faster debugging without putting the SoC 102 into an infinite loop.

At block 614, the result of not using the external pin A 108 to force the first check mode and enter the debug mode flow (block 604) is illustrated. In that case, there is no entry into debug mode flow. Instead, the ROM checksum fail debug flow is entered, which is described above with reference to FIG. 5 at block 504.

At block 616, the status of the SoC 102 is displayed. An SRAM error notification is displayed and the CPU enters an infinite loop to continue displaying the SRAM error notification. The error notification can be displayed on a display device such as the display device 208 that is coupled to the SoC 102, as shown on FIG. 2. Situations can arise, however, in which the status of the SoC 102 is not displayed (e.g., because of a bug or other error). In such situations, the CPU still enters an infinite loop at block 616, and the user can readily identify that the CPU is in an infinite loop by analyzing the program counter of the CPU (the program counter will remain the same due to the infinite loop). Thus, entering of the infinite loop can also be referred to as displaying of the SRAM error notification.

The signature-based sleep recovery operation flow discussed herein is a boot operation flow that includes a normal boot flow, a normal debug mode flow, a ROM checksum fail boot flow, and a sleep recovery boot flow. The signature-based sleep recovery operation flow uses a sleep recovery signature 300 and default signature to allow the SoC 102 to distinguish between its boot process when recovering from a sleep mode and its normal boot process.

The signature-based sleep recovery operation flow begins with normal boot flow. A signature comparison module 112 compares the sleep recovery signature 300 and the default signature. If the signatures match, the SoC 102 is recovering from a sleep mode and the operation flow enters the ROM checksum fail debug flow, which subjects each CPU to a checksum operation. If the CPUs satisfy the checksum operations, the operation flow continues to the sleep recovery boot flow. Otherwise, the SoC 102 will display an error message. Completion of the sleep recovery boot flow restores the SoC 102 to the state it was in when it entered the sleep mode.

If the sleep recovery signature and the default signature do not match, the signature-based sleep recovery operation flow continues in normal boot flow. This includes the use of an external pin A 108 that allows the user of the SoC to apply a first check mode that forces the operation flow to either continue the normal flow or enter the normal debug mode flow. If the normal boot flow continues, the SoC 102 will initialize all the system components and bring the SoC to a normal operational state. Use of the external pin A 108 to force the operation flow into the normal debug mode flow leads to a second check mode that is applied via the external pin B 110. If the second check mode is applied, the normal debug mode flow continues and the boot code is downloaded, debugged, and executed. If the second check mode is not applied, the SoC 102 will display an error message.

With further reference to FIGS. 1 and 2, the SoC 102 can be implemented in a variety of different devices. The device 200 can be any type of computing device such as one or a combination of a media device, computer device, television set-top box, video processing and/or rendering device, Ethernet interface, switch, appliance device, gaming device, electronic device, vehicle, workstation, smart phone, tablet, and/or in any other type of computing device.

The SoC 102 can include electronic circuitry, a microprocessor, memory, input-output (I/O) logic control, communication interfaces and components, other hardware, firmware, and/or software needed to run a device. The SoC 102 can also include an integrated data bus (not shown) that couples the various components of the SoC 102 for data communication between the components. A wireless communication device that includes the SoC 102 can also be implemented with many combinations of differing components.

Embodiments of the SoC 102 can include various components such as an input-output (I/O) logic control (e.g., to include electronic circuitry) and a processor (e.g., any of a microprocessor, microcontroller, or digital signal processor). The SoC 102 can also include a memory, which can be any type and/or combination of RAM, low-latency nonvolatile memory (e.g., Flash memory), ROM, one-time programmable memory, and/or other suitable electronic data storage. Alternately or additionally, the SoC 102 may comprise a memory interface for accessing additional or expandable off-chip memory, such as an external Flash memory module. The SoC 102 can also include various firmware and/or software, such as an operating system, which can be computer-executable instructions maintained by the memory and executed by the processor. The SoC 102 may also include other various communication interfaces and components, communication components, other hardware, firmware, and/or software, and so forth.

One or more of the methods or techniques described above can take the form of a computer program product accessible from a computer-usable or computer-readable medium providing program code for use by or in connection with a computer or any instruction execution system. For the purposes of this description, a computer-usable or computer-readable medium can be any apparatus that can tangibly store the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium can include computer-readable memory devices, which can be any of the devices or mediums discussed above, although excludes signals, signal transmission, and carrier waves.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method for booting a system-on-chip (SoC), the method comprising:
   retrieving a sleep recovery signature from a register of the SoC, the sleep recovery signature having been set in the register of the SoC prior to the SoC entering the sleep mode;
   comparing the sleep recovery signature to a default signature;
   entering, responsive to the sleep recovery signature matching the default signature, a ROM checksum fail debug flow; and
   entering, responsive to the sleep recovery signature not matching the default signature, a normal debug mode flow.

2. The method of claim 1, the ROM checksum fail debug flow further comprising:
   performing a checksum operation on a ROM of a first central processing unit (CPU);
   determining whether the checksum operation on the ROM of the first CPU fails;
   responsive to the checksum operation on the ROM of the first CPU failing, entering an infinite loop; and
   responsive to the checksum operation on the ROM of the first CPU not failing, performing a checksum operation on a ROM of an additional CPU.

3. The method of claim 2, further comprising, for each additional CPU:
   determining whether the checksum operation on the ROM of the additional CPU fails;
   responsive to the checksum operation on the ROM of the additional CPU failing, entering an infinite loop.

4. The method of claim 3, further comprising, responsive to the checksum operation on the ROM of the additional CPU not failing:
   determining whether to enter a sleep recovery boot flow;
   responsive to determining not to enter the sleep recovery boot flow, completing a normal boot flow to enter a fully functional state; and
   responsive to determining to enter the sleep recovery boot flow, completing sleep recovery operations that restore the SoC to an operational state that corresponds to an operational state that existed when the SoC entered the sleep mode.

5. The method of claim 4, the determining whether to enter a sleep recovery boot flow further comprising determining to enter the sleep recovery boot flow responsive to the sleep recovery signature matching the default signature.

6. The method of claim 1, the register further comprising a stack of multiple always on (AON) registers.

7. The method of claim 1, the normal debug mode flow further comprising:
   determining whether a first check mode operation has been activated via a first external pin;
   responsive to determining that the first check mode operation has been activated, continuing the normal debug mode flow;
   responsive to determining that the first check mode operation has not been activated, entering the ROM checksum fail debug flow;
   the continuing the normal debug mode flow including determining whether a second check mode operation has been activated via a second external pin; and
   responsive to determining that the second check mode operation has been activated, downloading a boot code for booting the SoC to a memory that is external to the SoC.

8. The method of claim 7, further comprising:
responsive to determining that the second check mode operation has not been activated, entering into an infinite loop displaying an error notification.

9. The method of claim 7, the first and second external pins comprising general purpose input/output (GPIO) pins.

10. A System-on-Chip (SoC), comprising:
a register; and
a controller with a signature comparison module configured to set a signature in the register prior to the SoC entering a sleep mode, and to, when recovering from the sleep mode:
retrieve a sleep recovery signature from the register;
compare the sleep recovery signature to a default signature;
enter, responsive to the sleep recovery signature matching the default signature, a ROM checksum fail debug flow; and
enter, responsive to the sleep recovery signature not matching the default signature, a normal debug mode flow.

11. The SoC of claim 10, the ROM checksum fail debug flow further comprising:
performing a checksum operation on a ROM of a first central processing unit (CPU);
determining whether the checksum operation on the ROM of the first CPU fails;
responsive to the checksum operation on the ROM of the first CPU failing, entering an infinite loop; and
responsive to the checksum operation on the ROM of the first CPU not failing, performing a checksum operation on a ROM of an additional CPU.

12. The SoC of claim 11, the ROM checksum fail debug flow further comprising, for each additional CPU:
determining whether the checksum operation on the ROM of the additional CPU fails;
responsive to the checksum operation on the ROM of the additional CPU failing, entering an infinite loop.

13. The SoC of claim 12, the ROM checksum fail debug flow further comprising, responsive to the checksum operation on the ROM of the additional CPU not failing:
determining whether to enter a sleep recovery boot flow;
responsive to determining not to enter the sleep recovery boot flow, completing a normal boot flow to enter a fully functional state; and
responsive to determining to enter the sleep recovery boot flow, completing sleep recovery operations that restore the SoC to an operational state that corresponds to an operational state that existed when the SoC entered the sleep mode.

14. The SoC of claim 13, the determining whether to enter a sleep recovery boot flow further comprising determining to enter the sleep recovery boot flow responsive to the sleep recovery signature matching the default signature.

15. The SoC of claim 10, the register comprising a stack of multiple always on (AON) registers.

16. The SoC of claim 10, the normal debug flow mode further comprising:
determining whether a first check mode operation has been activated via a first external pin of the SoC;
responsive to determining that the first check mode operation has been activated, continuing the normal debug mode flow;
responsive to determining that the first check mode operation has not been activated, entering the ROM checksum fail debug flow;
the continuing the normal debug mode flow including determining whether a second check mode operation has been activated via a second external pin of the SoC; and
responsive to determining that the second check mode operation has been activated, downloading, to a memory that is external to the SoC, a boot code for booting the SoC.

17. The SoC of claim 16, further comprising:
responsive to determining that the second check mode operation has not been activated, entering into an infinite loop displaying an error notification.

18. A device comprising:
a boot read only memory (ROM);
a memory; and
a system-on-chip (SoC), the SoC comprising:
a register; and
a controller configured to set a signature in the register prior to the SoC entering a sleep mode, and to, when recovering from the sleep mode:
retrieve a sleep recovery signature from the register;
compare the sleep recovery signature to a default signature;
enter, responsive the sleep recovery signature matching the default signature, a ROM checksum fail debug flow; and
enter, responsive to the sleep recovery signature not matching the default signature, a normal debug mode flow.

19. The device of claim 18, the device further comprising a first central processing unit (CPU) and an additional CPU, the ROM checksum fail debug flow further comprising:
performing a checksum operation on a ROM of the first CPU;
determining whether the checksum operation on the ROM of the first CPU fails;
responsive to the checksum operation on the ROM of the first CPU failing, entering an infinite loop;
responsive to the checksum operation on the ROM of the first CPU not failing, performing a checksum operation on a ROM of the additional CPU;
determining whether the checksum operation on the ROM of the additional CPU fails;
responsive to the checksum operation on the ROM of the additional CPU failing, entering an infinite loop;
responsive to the checksum operation on the ROM of the additional CPU not failing:
determining whether to enter a sleep recovery boot flow;
responsive to determining not to enter the sleep recovery boot flow, completing a normal boot flow to enter a fully functional state;
responsive to determining to enter the sleep recovery boot flow, completing sleep recovery operations that restore the SoC to an operational state that corresponds to an operational state that existed when the SoC entered the sleep mode.

20. The device of claim 18, the normal debug mode flow further comprising:
determining whether a first check mode operation has been activated via a first external pin of the SoC;
responsive to determining that the first check mode operation has been activated, continuing the normal debug mode flow;
responsive to determining that the first check mode operation has not been activated, entering the ROM checksum fail debug flow;

the continuing the normal debug mode flow including determining whether a second check mode operation has been activated via a second external pin of the SoC; and responsive to determining that the second check mode operation has been activated, downloading, to a memory that is external to the SoC, a boot code for booting the SoC.

* * * * *